June 29, 1926.
J. F. O'CONNOR
1,590,776
FRICTION SHOCK ABSORBING MECHANISM
Original Filed March 22, 1923   2 Sheets-Sheet 2
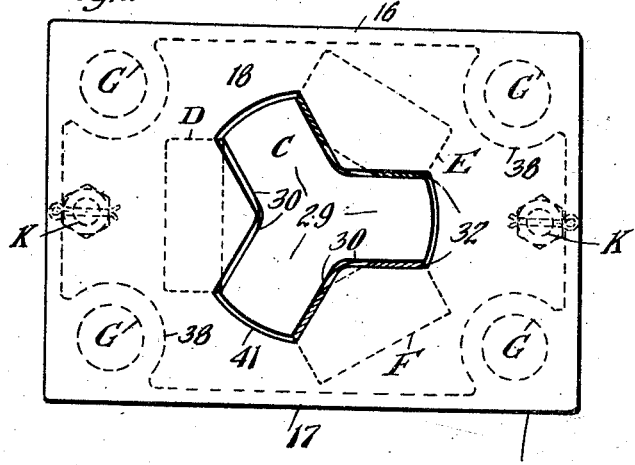
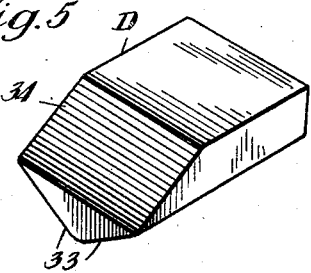
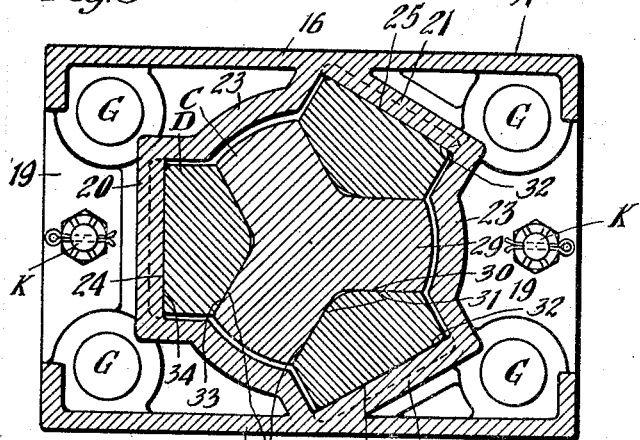
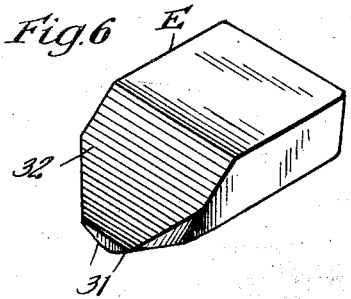
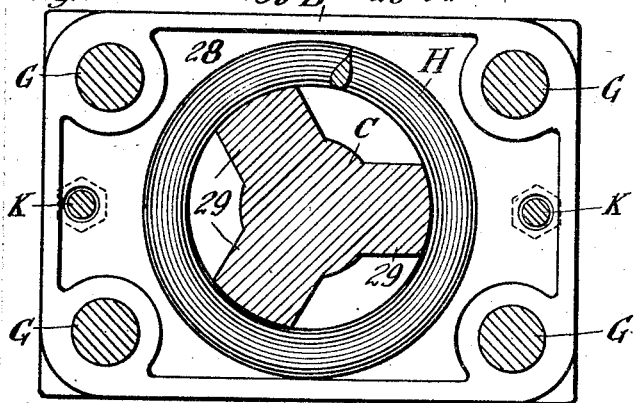
Witnesses
Wm. Geiger
Inventor
John F. O'Connor
By George I. Haight
His Atty.

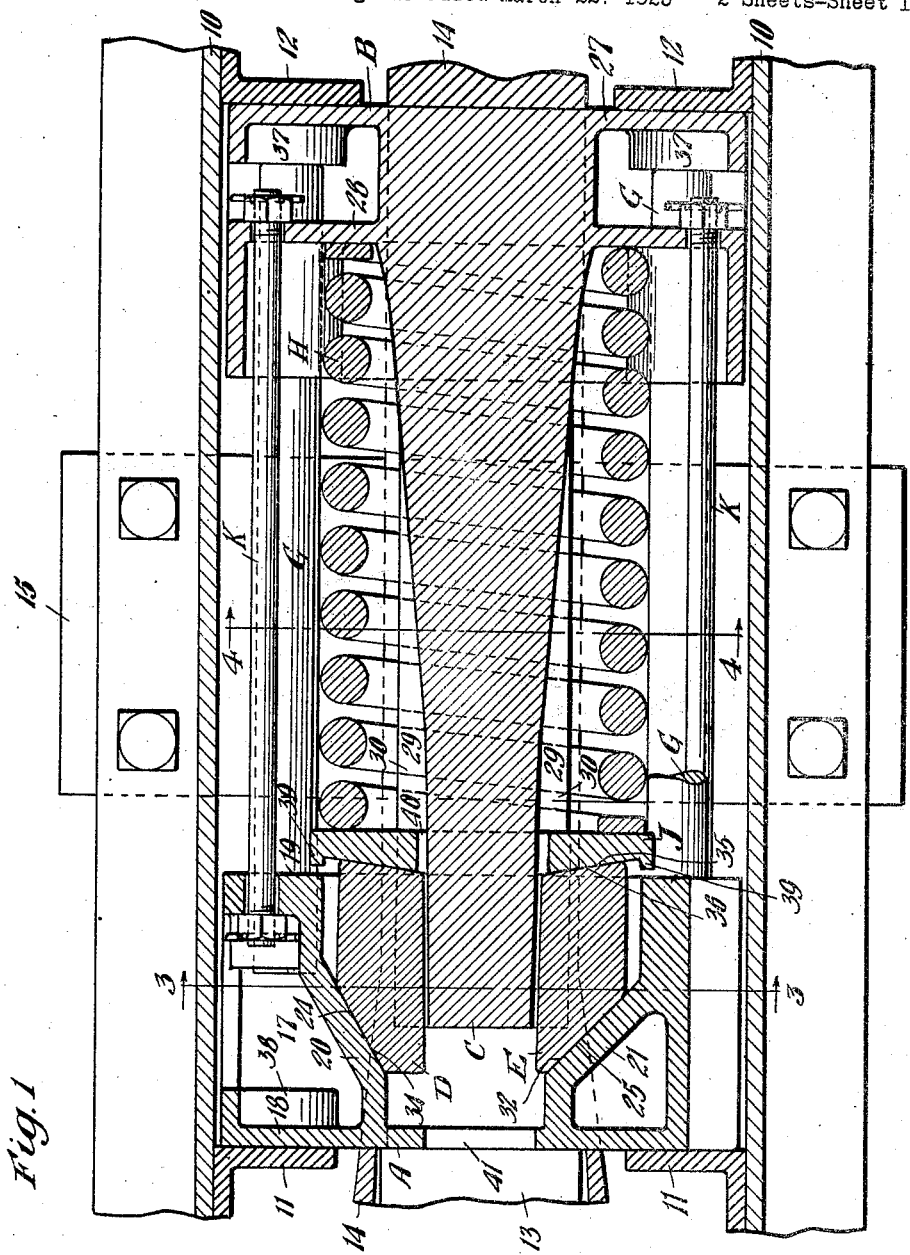

Patented June 29, 1926.

1,590,776

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed March 22, 1923, Serial No. 626,737. Renewed December 26, 1925.

This invention relates to improvements in friction shock absorbing mechanisms.

One object of the invention is to provide a friction shock absorbing mechanism, especially adapted for railway draft riggings, wherein is obtained high frictional capacity combined with assured release, the arrangement being such that the high friction capacity is developed during compression, by a system of wedge and friction elements having the attributes of a keen angle system, the release and return of the parts to normal position being obtained by the same system, of friction units, but which has the attributes of a blunt releasing angle wedge system, during the release action.

A further object of the invention is to provide a mechanism of the character indicated in the foregoing, wherein are employed a central friction post, a wedge pressure transmitting means, and a plurality of wedge friction shoes co-operating with said wedge pressure transmitting means and post, with some of the engaging faces of the wedge pressure transmitting means and shoes differing in angle from each other, by reason of which certain release of the mechanism is assured, without the use of the expensive anti-friction metal inserts heretofore employed.

Other objects and advantages of the invention will more clearly appear from the description and claims hereinafter following.

In the drawings forming a part of this specification, Fig. 1 is a longitudinal sectional view of a portion of a railway draft rigging, the section through the follower, friction elements and other parts, corresponding to two section planes at approximately 120° apart. Fig. 2 is a front end elevational view of the shock absorbing mechanism proper. Fig. 3 is a vertical, transverse, sectional view corresponding to the section line 3—3 of Fig. 1. Fig. 4 is a vertical, transverse sectional view corresponding substantially to the section line 4—4 of Fig. 1. And Figs. 5 and 6 are detail perspective views respectively, of a blunt angle friction shoe and a keen angle friction shoe.

In the drawings, 10—10 indicate the usual draft or center sills of a car under frame, said sills being preferably of channel cross section, and to the inner faces of which are secured front stop lugs 11—11 and rear stop lugs 12—12, of usual construction. A portion of the drawbar is indicated at 13, the same having operatively associated therewith a hooded cast yoke 14 of well known form, and within which is disposed the shock absorbing mechanism proper, hereinafter described. The yoke and the parts contained therein are supported in operative position by a detachable saddle plate 15.

The improved shock absorbing mechanism proper, as shown, comprises a combined front follower and wedge casing A; a rear follower casting B; a friction post C; three friction shoes D; E, and F; stop members G—G; a spring resistance H; a spring follower J; and a pair of retaining bolts K.

The combined front follower and wedge casting A is of hollow construction and comprises a top wall 16, a bottom wall 17, a front wall 18, a rear wall 19, and longitudinally arranged walls 20, 21, and 22 extending from the front wall 18 to the rear wall 19, the said walls 20, 21 and 22 being connected by curved web portions 23 and defining a casing in which the wedge friction shoes are housed. As clearly shown in Fig. 3, the walls 20, 21 and 22 are arranged symmetrically about the axis of the gear and are provided with interior rearwardly diverging flat faces 24, 25 and 26 respectively, the face 24 forming a true wedge face extending at a relatively keen angle with reference to the longitudinal axis of the gear, and the faces 25 and 26 forming relatively blunt wedge faces extending at a relatively blunt angle with reference to said longitudinal axis. The front wall 18 of the casting A is adapted to abut the front stop lugs 11 and co-act therewith in well known manner.

The rear follower casting B is of generally rectangular outline and has integrally formed therewith the friction post C. The follower B is provided with a rear wall 27 adapted to co-act with stop lugs 12, and a spaced web 28 laterally projecting from the rear end of the post C and extending parallel to the rear wall 27 of the follower.

The friction post C is provided at the forward end thereof with three equally spaced, radially projecting arms 29, thereby providing three longitudinally extending V-shaped friction surfaces 30 which diverge slightly in a direction toward the rear of the mechanism.

The two friction shoes E and F, preferably in the form of castings, are of like construction, each having a V-shaped inner friction surface 31 adapted to co-act with one of the V-shaped friction surfaces 30 of the post C. At the outer end, each friction shoe E and F is provided with a rearwardly and outwardly inclined face 32 co-operating with one of the faces 25 and 26 of the front follower and corresponding in angle thereto as clearly shown in Figs. 1 and 6. The third, or remaining shoe D is provided with a V-shaped inner friction surface 33 adapted to co-operate with the remaining V-shape friction surface 30 of the post C. At its outer end the shoe D is provided with an inclined wedge face 34 corresponding in angularity to and co-acting with the keen wedge face 24 of the front follower A.

The spring follower J is interposed between the rear ends of the wedge friction shoes D, E and F and the spring resistance H, the rear end of the spring resistance abutting the web 28 of the rear follower B. As clearly shown in Fig. 1, the spring follower J is provided with front faces 35 slightly inclined with reference to the transverse axis of the gear and co-acting with similarly inclined faces 36 at the rear ends of the wedge friction shoes D, E and F. The spring follower J is provided with forwardly projecting lugs 39 adapted to co-act with the friction wedge shoes D, E and F to hold the same in approximate position when assembling the gear. The spring follower J is also provided with a central perforation 40 corresponding in outline to the post C and loosely accommodating the same.

The stop member G are four in number, extend longitudinally of the mechanism and are located at the corners of the followers, slidably mounted between bosses 37 on the rear follower B, and the bosses 38 on the front follower A extending loosely through alined recesses in the web 28 and the rear wall 19 of the front follower A. The stop members G are of such a length that the front ends thereof are adapted to abut bosses 37 and 38 of the rear and front followers respectively, to limit the relative inward movement of the followers when the gear is fully compressed, thereby forming, in effect, stop columns by which the excess pressure is transmitted directly from the front follower to the rear follower. In this connection it will be noted that the front wall 18 of the follower A is recessed as indicated at 41 to receive the front end of the post C and permit the front wall of the follower A to pass inwardly beyond the outer end of the post when the gear is fully compressed, the recess 41 corresponding in outline to the cross section of the outer end of the post and loosely accommodating the same.

The retainer bolts K are two in number and are arranged at opposite sides of the gear midway of its height, each bolt having the rear end thereof anchored to the web 28 of the rear follower casting B and its front end anchored to the wall 19 of the front follower casting A.

The operation of the device is as follows, assuming a compression stroke of the mechanism. As the front follower A is forced inwardly of the gear there will be, initially, a slight movement of the keen angle wedge face 24 with respect to the co-acting, keen wedge face 34 of the shoe D. During this initial action, the two blunt angle shoes E and F will move inwardly of the shell, substantially in unison with the follower A, on account of the blunt, and relatively non-wedging angle of the faces 25 and 26 of the front follower A and the co-operating faces 32 of the shoes E and F, thus advancing the shoes E and F longitudinally slightly ahead of the keen angle shoe D. As the parts continue their movement inwardly, there will be substantially no further slippage between the faces 24 and 34 of the front follower A and the shoe D respectively. As will be evident, due to the slight advance of the shoes E and F relative to the shoe D, the spring follower J will be displaced or moved a slight distance from the inner end of the shoe D. In this connection, special reference is made to Fig. 3, where it will be noted that the area of contact between the inner ends of the two blunt angle shoes E and F with the front face of the spring follower J is considerably greater than the area of contact between the inner end of the shoe D and said spring follower, extending for more than half the circumference of the spring follower J. With this arrangement, the two shoes E and F advancing together in unison, the spring follower J is maintained in proper position, that is, at right angles to the axis of the mechanism, and without the spring cap being tilted by the pressure of the spring. While the spring follower J is out of engagement with the inner end of the keen angle shoe D during the compression stroke, as hereinbefore described, nevertheless it will be apparent that the shoe D always affords resistance because of the friction between the surface 33 thereof and the friction surface 30 of the friction post C, this friction acting to retard the shoe D during the compression stroke of the mechanism. Due to the taper of the friction surfaces of the post, a further relative longitudinal displacement between the blunt angle shoes and the keen angle shoe will arise, this action being readily accommodated on the sets of blunt angle, inclined faces of the front follower and blunt angle shoes, said blunt angle faces acting in the nature of safety valves for this purpose and preventing bursting of the follower. The front follower being of metal, the wedge shell portion thereof is capable of a limited amount of expansion which takes place during compression of the mechanism.

Upon the removal of the compression force, there is an initial releasing action induced by the inward contraction of the wedge shell portion of the front follower A. This contraction of the follower A results in a slight forward movement of the follower, the said action being accommodated on the blunt angle inclined faces 25, 26 and 34. The releasing action, thus described, then results in also loosening the wedging face of the shoe D and the front follower A sufficiently to thereafter permit the reduction of pressure between the friction surfaces of all the shoes and the friction surfaces of the post C, whereupon the spring becomes effective to move all of the friction shoes outwardly of the shell and restore the parts to normal position. At the beginning of the outward movement, the spring follower J will, obviously, move first the two blunt angle shoes E and F in an outward direction and immediately thereafter engage the keen angle shoe D and also move it out longitudinally. When the friction shoes have reached their limit of outward movement, they will have been restored to normal position and, on account of the extended area of contact between the two blunt angle shoes and the spring follower, which maintains the latter perpendicular to the axis, all three shoes will be brought to rest as best shown in Fig. 1.

It will be evident that the angularity of the blunt and keen faces of the friction shoes may be varied within certain limits and yet accomplish the desired result, the inclination of the wedge faces of the blunt and keen angle shoes, however being preferably 45° and 30° respectively, with reference to the longitudinal axis of the gear.

It will be evident from the preceding description, that by providing blunt and keen angle wedging means and wedge friction shoes, certain release of the wedging mechanism and the friction shoes is assured without the use of the usual anti-friction means, consisting of anti-friction metal inserts, between the wedging surfaces.

I have herein shown and described what I now consider the preferred manner of carrying out my invention, but the same is merely illustrative and I contemplate all changes and modifications that come within the scope of the claims appended hereto.

I claim:—

1. In a friction shock absorbing mechanism, the combination with a central friction element; of a series of friction shoes co-operable with said element; a spring resistance; and a wedge pressure transmitting means co-operable with said shoes, said shoes and wedge pressure transmitting means having a plurality of co-acting sets of faces, part of which are arranged at a relatively keen wedge acting angle and others at a relatively blunt releasing angle.

2. In a friction shock absorbing mechanism, the combination with front and rear followers; of a central friction post having a plurality of exterior friction surfaces; a plurality of friction shoes, each of said shoes co-operating with one of said post friction surfaces; a spring resistance; and a wedge pressure transmitting means co-operable with said shoes, said shoes and wedge pressure-transmitting means having a plurality of co-operating sets of faces, part of which are arranged at a relatively keen wedge acting angle and others at a relatively blunt releasing angle, said wedge pressure-transmitting means being formed integral with the front follower.

3. In a friction shock absorbing mechanism, the combination with a friction post having a plurality of friction surfaces; of a plurality of friction shoes co-operable with said post friction surfaces; a spring resistance; and wedge acting means co-operating with said shoes, said shoes and means having a plurality of co-operating sets of faces, part of which are arranged at a relatively keen wedging angle with respect to forces applied substantially parallel to the axis of the mechanism, and others at a relatively blunt releasing angle, said wedge acting means comprising a single pressure transmitting means having the wedge faces on the interior thereof.

4. In a friction shock absorbing mechanism, the combination with a central friction element having longitudinally extending tapering friction surfaces; of a spring resistance; a plurality of friction shoes co-operating with said friction surfaces; a pressure transmitting wedging means co-operating with said shoes, one of said shoes having a wedge face at an angle which is acute and of high friction creating capacity, another shoe in opposed relation having a face engaged by said wedge at a wedge releasing angle.

5. In a friction shock absorbing mechanism, the combination with a central friction element having longitudinally arranged, tapering friction surfaces thereon; of a spring resistance; a series of three friction shoes surrounding said element and slidable on said longitudinally arranged friction surfaces; a wedge co-acting with said shoes, one of said shoes having a wedge face at an angle which is acute and of high friction creating capacity, and the remaining shoes having faces engaged by said wedge at a releasing angle.

6. In a friction shock absorbing mechanism, the combination with a front follower having interior wedge faces; of a rear follower member provided with an integral friction post; a plurality of friction shoes co-acting with said post, said shoes being provided with faces co-acting with the wedge faces of said front follower, the co-acting wedge faces of said shoes and follower being arranged partly at a keen, relatively wedge-acting angle during compression of the mechanism and partly at a blunt, relatively non-wedge-acting angle during the compression stroke, and a main spring resistance cooperating with said shoes.

7. In a friction shock absorbing mechanism, the combination with a front follower provided with a plurality of wedge faces extending at different angles with reference to the longitudinal axis of the gear; of a rear follower; a central friction element; a spring resistance; a plurality of opposing friction shoes, one of said shoes having a wedge face inclined at an angle relatively away from the axis of the gear and toward the rear thereof and co-operating with a similarly inclined face of said front follower, and an opposing shoe having an outer face inclined at a different angle away from the axis and rearwardly of the gear and co-operating with a similarly inclined face of said front follower.

8. In a friction shock absorbing mechanism, the combination with a follower provided with a plurality of integral faces, inclined with respect to the line of applied force, certain of said faces being inclined to said line at a blunter angle than the remainder of said faces; of a friction element having a plurality of longitudinally extending friction surfaces, the number of said surfaces corresponding to the number of said inclined faces, said friction surfaces converging slightly in one direction; a spring resistance; and a plurality of friction shoes, each co-operable with a friction surface of said element, said shoes having also inclined faces co-operable with the corresponding inclined faces of said follower.

In witness that I claim the foregoing I have hereunto subscribed my name this 20th day of March 1923.

JOHN F. O'CONNOR.